Nov. 11, 1952         L. S. ROSENER           2,617,546
                   AUTOMATIC CONVEYING APPARATUS
Filed Feb. 17, 1947                         4 Sheets-Sheet 1
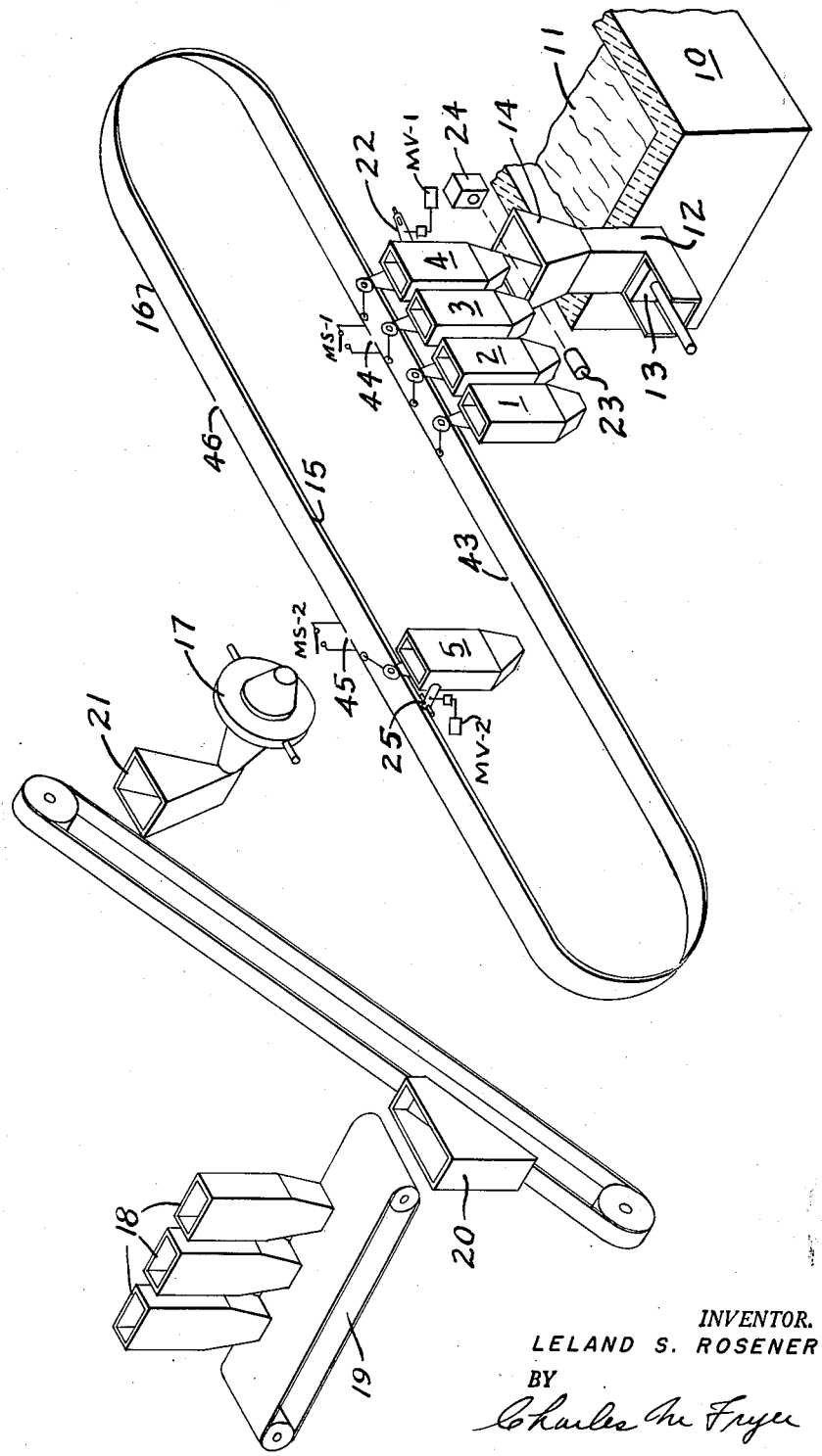
INVENTOR.
LELAND S. ROSENER
BY
Charles M. Fryer
ATTORNEY

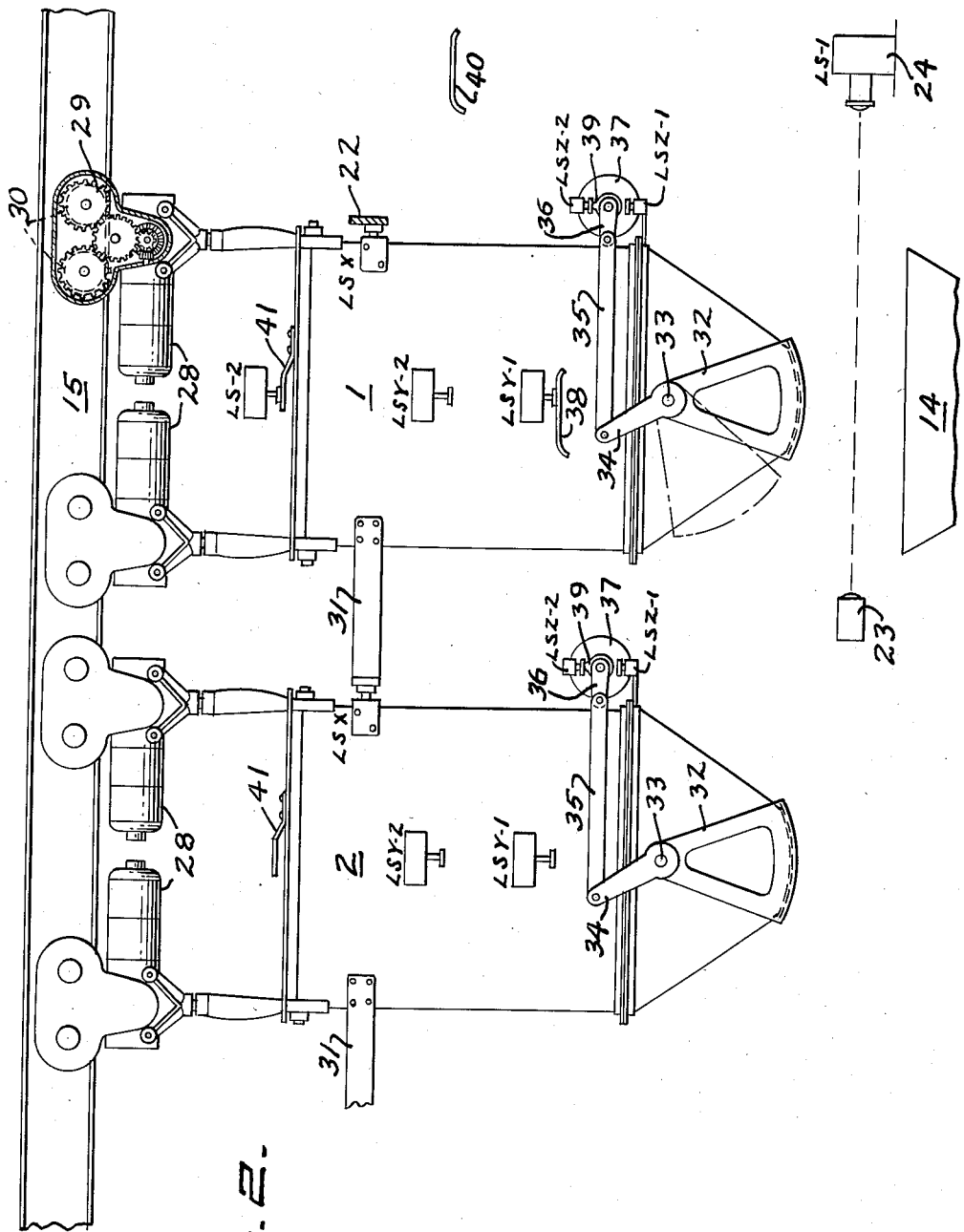

Nov. 11, 1952     L. S. ROSENER     2,617,546
AUTOMATIC CONVEYING APPARATUS
Filed Feb. 17, 1947     4 Sheets-Sheet 3
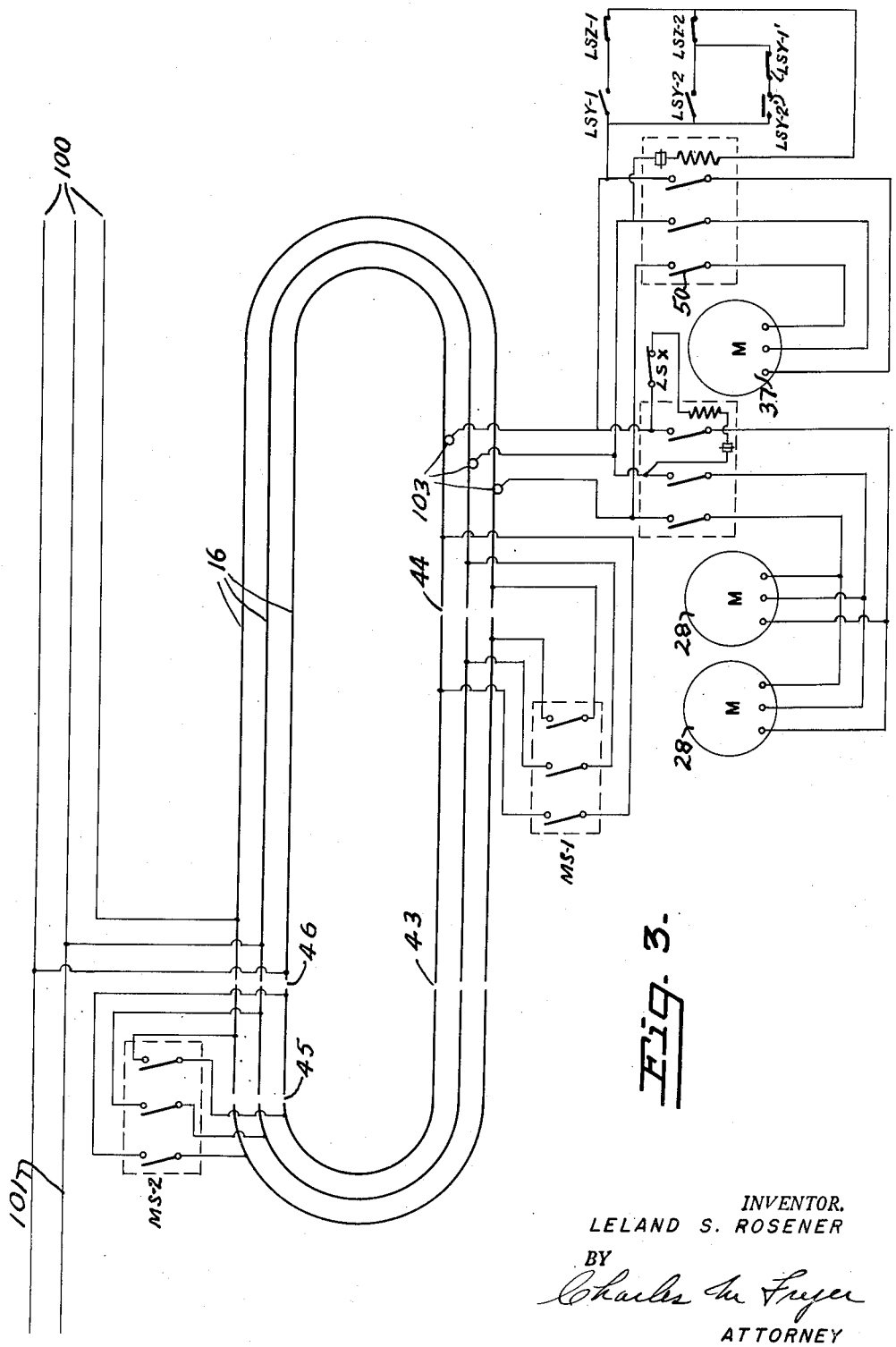
INVENTOR.
LELAND S. ROSENER
BY
Charles M. Fryer
ATTORNEY Nov. 11, 1952 L. S. ROSENER 2,617,546
AUTOMATIC CONVEYING APPARATUS
Filed Feb. 17, 1947 4 Sheets-Sheet 4
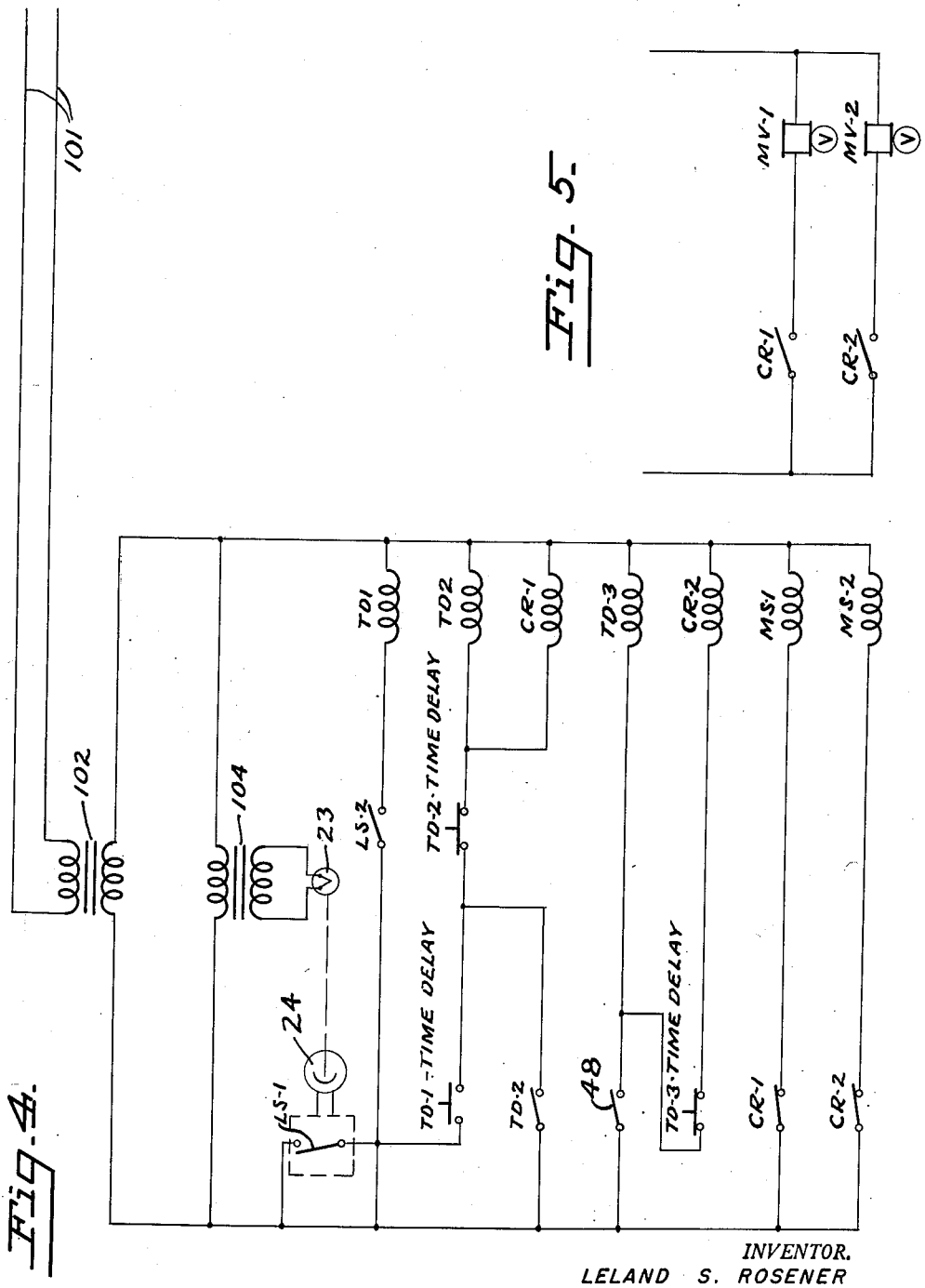
INVENTOR.
LELAND S. ROSENER
BY
Charles M. Fryer
ATTORNEY Patented Nov. 11, 1952

2,617,546

UNITED STATES PATENT OFFICE 2,617,546

AUTOMATIC CONVEYING APPARATUS

Leland S. Rosener, San Francisco, Calif., assignor, by mesne assignments, to Glass Containers, Inc., San Francisco, Calif., a corporation of California Application February 17, 1947, Serial No. 729,127

3 Claims. (Cl. 214—44)

This invention relates to apparatus for conveying material to a location where the material is used and for automatically conveying a supply of material consistent with the rate at which it is being consumed.

The invention has particular application to the manufacture of glass and will be described herein with reference to such application though its adaptability to other industries and uses will be apparent from an understanding of its principles gained from the following description.

In the glass industry and particularly in the manufacture of small glass articles, such as bottles, raw material in granular form is fed to a large furnace. The furnace contains a mass of molten glass and while small quantities or gobs are withdrawn from one end thereof to supply the molds which shape the finished product, the granular constituents are added to the opposite end for gradual melting down and assimilation by the molten mass. These granular constituents are pre-mixed according to formula in so-called "batches" and the batches are deposited in a hopper or "dog house" in communication with the furnace and from which it is slowly fed into the furnace by automatic apparatus designed for that purpose. It is customary to prepare batches of several tons in weight and apparatus is now available for weighing out the various ingredients of a batch so that it may be mixed, deposited in a conveyor and directed to the dog house where it is dumped as necessity demands.

The present invention relates particularly to mechanism to be employed between the batch mixing apparatus or batch house and the dog house associated with the furnace and has for one of its objects the provision of means to effect automatic replenishing of the granular batch in the dog house without the necessity of observation by an attendant.

It is common practice to deposit batches from a mixer in receptacles of large capacity usually referred to as "cans" which travel on an overhead track. A power or tractor unit also operating on said track under control of an operator has been employed to push or tow the loaded batch cans to a position over the dog house and the operator discharged the contents of a can into the dog house whenever the supply therein became low. The present invention contemplates the use of such batch cans but has for another of its objects the provision of means for advancing them over the track, positioning them over the dog house, discharging their contents and returning the empty cans to the batch house for refilling, all automatically and in accordance with the rate at which the material is being delivered to the furnace. A detailed description of the invention and further and more specific objects and advantages thereof are set forth in the following specification wherein reference is made to the accompanying drawings.

In the drawings:

Fig. 1 is a schematic view of a glass furnace, a batch mixing apparatus and a conveying apparatus embodying the present invention interposed between the batch mixer and the furnace;

Fig. 2 is an enlarged schematic view of a portion of the conveying apparatus illustrated in Fig. 1 showing some of the control mechanism associated therewith;

Fig. 3 is a partial wiring diagram of the electrical controls associated with the conveying apparatus;

Fig. 4 is a continuation of the wiring diagram shown in Fig. 3; and

Fig. 5 is a supplementary wiring diagram.

In Fig. 1 of the drawings, a portion of a glass furnace is indicated at 10 as containing a mass of molten glass 11, a conventional dog house 12 is provided at one end of the furnace and includes a feeding mechanism including a pusher 13 reciprocated by mechanism, not shown, to advance granular material in the dog house through an opening provided through the furnace wall and in communication with the bottom of the dog house. A hopper 14 receives the material and directs it into the dog house. Conveyors or cans shown at 1, 2, 3, 4 and 5 of which there may be any desirable number are suspended from and travel along an endless track 15 and are electrically powered through a circuit including a trolley 16. The trolley 16 diagrammatically illustrated by a single line is in fact made up of a three wire two phase circuit as will be apparent from the following description in connection with Fig. 3. The cans are filled by a mixer indicated at 17. Batches of material are fed to the mixer by a conventional system including a set of scales 18 to weigh and deposit the various constituents of the mix on a conveyor belt 19. These materials are deposited in a skip hoist 20 by means of which they are elevated and discharged into a hopper 21 associated with the mixer 17. The scales and conveying mechanism associated therewith may be of any well known type designed for this purpose such, for example, as those manufactured under the name of "Richardson's Scales." The entire operation of weighing, conveying and mixing is automatically electrically controlled by means which do not form part of the present invention.

To summarize the operation of the conveying mechanism illustrated in Fig. 1, the can 1 containing a mixed batch is stopped in a position directly over the dog house hopper 14 by means of a semaphore arm 22 which contacts a switch on the can to open the circuit energizing the can driving motors. The approach of the can to this position also automatically opens a gate for permitting its contents to flow into the hopper 14. An electric lamp 23 casts a beam of light indicated by a dotted line directly across the top of the hopper and on to a photosensitive cell 24 controlling a switch. This switch in turn controls the operation of the semaphore 22. The light beam is interrupted by the presence of a mound of granular material in the hopper, or by the presence of material flowing between the can and the hopper, but in the absence of such material, the beam strikes the photosensitive cell and effects raising of the semaphore 22. This causes energization of the can driving motors and the can proceeds along the endless track in an empty condition until it reaches the semaphore arm 25 again bringing it to rest this time beneath the mixer 17 where it will be refilled.

When the can 5 of Fig. 1 has been refilled, it is released for travel to a position behind the row of cans 1, 2, 3 and 4. The driving motors of each of these cans are de-energized by contact of a control switch on the can with the rear end of the preceding can.

A schematic arrangement of the several control switches employed for effecting this automatic travel of the cans is shown in Fig. 2 of the drawings, though it should be understood that this arrangement is only to illustrate the principles of the invention and that the actual positions of the switches may be varied in the interest of efficiency and convenience. In this figure, cans 1 and 2 of Fig. 1 are illustrated on an enlarged scale and each can is illustrated as suspended from a pair of electric motor driving units operating on the overhead track 15. This track may be in the form of an I beam. Each of the driving units may comprise an electric motor 28 connected as through a train of gears 29 with rollers 30 supported by the track 15. A single motor could be employed for each can but two are preferred. The motors 28 are controlled by a switch LSX normally closed and adapted to be opened when its projecting part is depressed. On can 1, the switch LSX is shown as having been opened by engagement with the semaphore arm 22. The cans are illustrated as provided with rearwardly extending arms 31 so that as the cans approach each other, each is stopped by contact of its switch LSX with the preceding can, or the arm 31 thereof, which has already been brought to a stop. Each can is also provided with a gate 32 arranged to pivot about a shaft 33 for opening and closing a discharge spout at the lower end of the can. An arm 34 also connected with the shaft 33 is connected by a link 35 with a crank arm 36 driven by a gate motor 37. The gate motor 37 is controlled by four switches, a switch LSY-1 carried by the can is closed upon engagement with a fixed can 38 as the can approaches its position over the hopper 14. Closing of the switch LSY-1 energizes the motor which rotates in a counter-clockwise direction as viewed in Fig. 2 to swing the gate 32 to its open position illustrated in dotted lines. Operation of the crank 36 in opening the gate is limited to 180° by a switch LSZ-1 arranged to be contacted by a cam 39 carried on the shaft that operates the crank 36. Thus, as the can comes to rest over the hopper 14 the gate 32 is swung to its open position where it remains as long as the can remains over the hopper. Shortly after the batch in the can starts to discharge into the hopper, the photosensitive cell 24 controlling the switch LS-1, which has been previously cut out of the circuit for a limited period of time, as will hereinafter be described in detail, becomes effective and the can will remain in its position over the hopper 14 until all of its contents are discharged and until the beam of light from the source 23 strikes the photosensitive cell to actuate the switch LS-1 associated therewith. Switch LS-1 in turn energizes a magnetic valve, designated MV-1 in Fig. 1, for admitting fluid to a cylinder for the purpose of raising the semaphore 22. Upon removal of the semaphore 22 from its point of contact with the self-closing switch LSX, this switch effects energization of the driving motors 28 and causes the can to commence its motion toward the batch house where it will receive another charge from the mixer 17. As the can leaves the dog house position illustrated in Fig. 2, switch LSY-2 carried by the can is closed by engagement with a fixed cam 40 to energize the motor 37 for closing the gate 32. The gate closing movement of the motor 37 is again limited to 180° by contact of the cam 39 with a switch LSZ-2 arranged diametrically opposite to the switch LSZ-1.

A stationary switch LS-2 disposed above the hopper 14 is shown as contacted by a cam 41 carried by the can so that as the can moves into position over the hopper the switch LS-1 of the photosensitive cell is cut into circuit but subject to a brief time delay permitting the gate 32 to open and permitting the flow of material which interrupts the light source to be initiated before the switch LS-1 becomes effective to raise the semaphore 22.

As the cans 1, 2, 3 and 4 may be lined up in any number awaiting time for their contents to be discharged into the dog house hopper and, as a number of cans may likewise be lined up behind the can 5 in the batch house, as it is illustrated in Fig. 1, it is desirable to prevent immediate follow up of the succeeding cans when the first can leaves the position shown. To prevent this, a portion of the trolley 16 may be sectionalized or separated from the main trolley as by gaps 43 and 44 and the separated section of trolley is controlled by a switch MS-1. Likewise, as the cans approach the position in the batch house, a section of trolley may be separated from the main trolley as by gaps 45 and 46 and this section is controlled by a switch MS-2. The same means employed for raising the semaphore MV-1 controlling the first can over the dog house and the semaphore MV-2 controlling the first can in the batch house may, therefore, be employed to control the switches MS-1 and MS-2. Consequently, as the first can in line is released and the semaphore is held up for a limited period of time, the sectionalized portions of the track are de-energized and the driving motors of the succeeding cans can not be energized to advance the cans until the end of the selected time period.

The manner in which all of the switches and electric circuits described are correlated to effect the required automatic operation of the cans may be understood by reference to Figs. 3, 4 and 5 of the drawing wherein the electric circuits are diagrammatically illustrated. Fig. 3 shows a two phase circuit 100 for energizing the three wire trolley 16. The motor and switch circuits on one of the cans are shown as connected with the trolley 16 by trolley rollers 103. A single phase circuit represented by the conductors 101 extended to Fig. 4 operate through a voltage reducing transformer 102 in the latter figure to energize the switch circuit there shown. Fig. 5 represents a portion of a direct current circuit employed for actuating magnetic valves of the direct current type. This circuit is, however, an adjunct of the alternating current circuit shown in Fig. 4 and could be directly connected therewith if alternating current magnetic valves were employed. In fact the switches designated as CR-1 and CR-2 in both Figs. 4 and 5 are actually separate contact points on the same relay switches as will presently appear.

In Fig. 4 a starting switch 48 is shown and this switch is closed upon completion of the discharging operation of the mixer 17 after it deposits a batch in the can positioned as illustrated at 5 in Fig. 1. The closing of the switch 48 automatically upon discharging of the contents of the mixer may be accomplished by any suitable mechanical connection between the mixer and the switch or will preferably be effected through electrical connection with the conventional control panel in the batch house.

Closing of the switch 48 energizes a time delay relay TD-3 designed to hold the circuit closed for a limited period of time, say, about four seconds. This energizes the coil of relay CR-2 which in turn energizes and actuates the magnetic valve MV-2 (Fig. 5) to raise the batch house semaphore for the limited time of about four seconds. This time enables the can which has been released by raising of the semaphore to move forwardly beyond the semaphore position before the semaphore again drops to its can interrupting position. The relay CR-2 also controls magnetic switch MS-2, the contacts of which appear on Fig. 3, to de-energize that section of the trolley between gaps 45 and 46 so that the cans to be moved up toward the position previously occupied by the can 5 will remain at rest until the semaphore has descended to a can interrupting position. This movement of an empty can to its position below the mixer may be employed through conventional switch means to initiate a new batch weighing and mixing cycle in the batch house.

Referring now to the can illustrated at 4 in Fig. 1, which is over the dog house hopper 14, its normally closed switch LSX (Fig. 3) is open, because of its contact with semaphore 22, to de-energize the driving motors 28. Each of the cans shown at 2, 3 and 4 remains at rest because its control switch LSX is in contact with the can next preceding it. However, just as the can 1 approached its position over the dog house its limit switch LSY-1, shown as normally opened in Fig. 3, was closed by contact with the cam 38 to effect closing of contacts 50 for energizing the gate motor 37. The cam actuated switch LSZ-1, shown as normally closed in Fig. 3, is open as the gate reaches its fully opened position, to break the circuit through contacts 50 to the motor 37.

Also, as the can reaches its position over the dog house hopper, it engages and closes normally open switch LS-2 (Fig. 4) completing a circuit through and closing a time delay relay TD-1. This time delay relay completes the circuit through the switch LS-1 controlled by the photosensitive cell 24 but as its timing mechanism requires a time of approximately four seconds before closing, the switch LS-1 is disabled for a period of time sufficient to permit the gate to open and to permit the discharge of material from the can to commence and to interrupt the beam of light from the light source 23, shown in Fig. 4 as energized through transformer 104. Thus, it is only after the beam has been interrupted that the switch LS-1 controlled by the photosensitive cell opens and the circuit to the time delay contacts of TD-2 remains open. Now, after the can has discharged its contents and the beam of light passing over the hopper 14 is received by the photosensitive cell the switch LS-1 closes, completing a circuit through the time delay switch TD-2. Since the TD-2 time delay switch is normally closed, its coil TD-2 will be energized and sealed in through the contacts of its own switch. Relay CR-1 being in parallel with time delay switch TD-2 will also close to accomplish two results. First, as CR-1 closes, it energizes the magnet valve MV-1 to raise the semaphore 22 and release the empty can from its position over the dog house. Secondly, it will de-energize magnetic switch MS-1, the contacts of which appear on Fig. 3, to break the circuit to that section of the trolley between gaps 43 and 44, thus preventing starting of the succeeding cans until the empty can is on its way and the semaphore has returned to its can interrupting position. However, as soon as the four second time period has elapsed, the time delay switch TD-2 opens and interrupts its sealing circuit through its coil TD-2. Even though the switch LS-1 controlled by the photosensitive cell is now closed, time delay switch TD-2 remains de-energized because switch LS-2 remains open as long as there is no can in the dog house position. Consequently, relay CR-1 is de-energized and again permits magnetic switch MS-1 to close the circuit to the de-energized section of trolley so that the waiting cans can move forwardly until the first one attains its position over the dog house hopper where it will be interrupted by the semaphore arm.

As the empty can leaves the dog house, its discharge gate 32 is closed during its approach to the batch house where it is to be refilled. The gate motor is energized for closing the gate by contact of normally open switch LSY-2 and is de-energized at 180 degrees, or upon closing of the gate by cam actuated switch LSZ-2. The operation of LSY-2 differs from that of LSY-1 because LSY-1 is held closed by cam 38 (Fig. 2) while the can is stationary at the dog house, and LSY-2 is only momentarily closed as it passes over cam 40 while the can is in motion. Therefore, a holding circuit is provided with switch LSY-2' (see Fig. 3) for sealing in the circuit to the motor switch until it is broken by LSZ-2. However, upon the operation of switch LSY-1, no holding circuit is necessary and normally closed contact LSY-1' operates with switch LSY-1 to open or disable the holding circuit.

I claim:

1. In a conveying apparatus, a plurality of receptacles adapted to move along a track, an electric driving motor for each receptacle, a trolley system for energizing the motors, a motor cut out switch on each receptacle adapted to disable the motor when the receptacle encounters an obstruction, a discharge station, a swinging arm adjacent said station movable to an obstructing position, means to remove said arm to permit travel of an empty receptacle from said station, and means to de-energize a section of trolley preceding the station while the arm is removed to prevent advance of other receptacles toward the station until the arm resumes its obstructing position.

2. In a conveying system a track, receptacles movable on the track, a discharge station, means automatically to stop a filled receptacle at the station and to cause it to discharge its contents, means causing release of the empty receptacle controlled by a circuit with a photo-sensitive cell responsive to lack of material at the station, and means including time delay mechanism for energizing said circuit when the filled receptacle approaches the station but not until it has commenced to discharge its contents.

3. In a conveying system, a track, a plurality of motor driven receptacles operating on said track, a trolley system for energizing the motors, a switch disposed forwardly of each receptacle and engageable with a preceding receptacle or an obstruction to de-energize the driving motor thereof, a pivoted arm movable to and away from an obstructing position for stopping one receptacle and causing succeeding receptacles to come to rest behind it, means to pivot said arm for releasing the first receptacle, and means operating upon such release to de-energize the portion of trolley serving the succeeding receptacles to prevent their forward movement until the pivoted arm resumes its obstructing position.

LELAND S. ROSENER.

REFERENCES CITED

The following references are of record in the file of this patent:

UNITED STATES PATENTS

| Number | Name | Date |
|---|---|---|
| 864,649 | Jordalen | Aug. 27, 1907 |
| 1,230,820 | Levalley et al. | June 19, 1917 |
| 1,461,801 | McGregor | July 17, 1923 |
| 1,666,027 | Beaumont | Apr. 10, 1928 |
| 1,938,104 | Jennings | Dec. 12, 1933 |
| 2,039,473 | Bennington | May 5, 1936 |
| 2,074,953 | Beatty et al. | Mar. 23, 1937 |
| 2,288,763 | Winship et al. | July 7, 1942 |
| 2,321,073 | Farrell | June 8, 1943 |